(12) United States Patent
Smith et al.

(10) Patent No.: US 7,932,216 B2
(45) Date of Patent: Apr. 26, 2011

(54) NON-PHOSPHORUS-BASED GELLANTS FOR HYDROCARBON FLUIDS

(75) Inventors: Clayton Smith, Edmonton (CA); Simon John Michael Levey, Edmonton (CA)

(73) Assignee: Weatherford Engineered Chemistry Canada Ltd, Edmonton (CA)

( * ) Notice: Subject to any disclaimer, the term of this patent is extended or adjusted under 35 U.S.C. 154(b) by 452 days.

(21) Appl. No.: 11/957,248

(22) Filed: Dec. 14, 2007

(65) Prior Publication Data
US 2008/0146466 A1   Jun. 19, 2008

Related U.S. Application Data

(60) Provisional application No. 60/870,087, filed on Dec. 14, 2006.

(51) Int. Cl.
C09K 8/60 (2006.01)
C09K 8/528 (2006.01)
C09K 8/64 (2006.01)
E21B 43/26 (2006.01)

(52) U.S. Cl. ...... 507/267; 507/241; 507/265; 166/308.4
(58) Field of Classification Search ............. 507/241, 507/265, 267; 166/308.4
See application file for complete search history.

(56) References Cited

U.S. PATENT DOCUMENTS

| | | | |
|---|---|---|---|
| 3,539,310 A | 11/1970 | Finkelstein et al. | |
| 3,791,972 A | 2/1974 | Myers | |
| 3,799,267 A | 3/1974 | Ely et al. | |
| 3,900,070 A | 8/1975 | Chatterji et al. | |
| 4,981,608 A | 1/1991 | Gunther | |
| 5,614,010 A | 3/1997 | Smith et al. | |
| 6,149,693 A | 11/2000 | Geib | |
| 6,248,699 B1 | 6/2001 | Subramanian et al. | |
| 6,849,581 B1 | 2/2005 | Thompson et al. | |
| 7,066,262 B2 | 6/2006 | Funkhouser | |
| 2004/0142825 A1* | 7/2004 | Jovancicevic et al. | 507/200 |
| 2005/0233911 A1* | 10/2005 | Samuel | 507/238 |

FOREIGN PATENT DOCUMENTS
WO    01/09482    2/2001

OTHER PUBLICATIONS

Weldon M. Harms; "Application of chemistry in oil and gas well fracturing" Oil Field Chemistry, ACS Symposium #396-1988; American Chemical Society 1989; pp. 59-60.

* cited by examiner

Primary Examiner — Timothy J. Kugel
Assistant Examiner — Aiqun Li
(74) Attorney, Agent, or Firm — Linda M. Thompson; Sean W. Goodwin

(57) ABSTRACT

A substantially liquid gellant formed as one or more reaction products of a metal carboxylate or metal carboxylate amine salt, one or more organic acids, an ester which drives the reaction so that the reaction products are asymmetrical in structure, and a rheology modifier which preferentially interacts between the reaction products for prevent solidifying of the gellant reaction products until such time as the gellant is mixed with the fracturing fluid containing an activator after which the reaction products preferentially interact with the activator to gel the fracturing fluid. The resulting gellant is capable of gelling a hydrocarbon base fluid in less than about 30 seconds.

16 Claims, No Drawings

NON-PHOSPHORUS-BASED GELLANTS FOR HYDROCARBON FLUIDS

CROSS REFERENCE TO RELATED APPLICATION

This application is a regular application claiming priority of U.S. Provisional Patent application Ser. No. 60/870,087, filed on Dec. 14, 2006, the entirety of which is incorporated herein by reference.

FIELD OF THE INVENTION

Embodiments of the invention relate to additives for gelling of hydrocarbon fluids and more particularly to gellants for use in hydraulic fracturing fluids applied "on the fly" in the field.

BACKGROUND OF THE INVENTION

Hydraulic fracturing is well known for use in stimulating the production of hydrocarbons, such as oil or natural gas, from subterranean formations.

A fracturing fluid is injected through a wellbore and propelled against the formation rock by high pressure sufficient to cause the rock to crack and fracture. The fracturing fluid also carries proppant to the fracture site which remains in the fracture thereby propping the fracture open when the well is in production. The proppant material is commonly sand, but can be sintered bauxite, glass beads, or synthetic materials such as polystyrene beads and the like. In order to facilitate the transportation of the proppant into the formation, the fracturing fluid must have sufficient viscosity or the proppant particles may settle out in the wellbore and cause piling problems, known in the industry.

The development of gelling hydrocarbons to obtain suitable viscosity to carry the proppant in fracturing fluids was reviewed by Weldon M. Harms in Oil-Field Chemistry (ACS Symposium #396-1988) published by the American Chemical Society in 1989 in a chapter entitled "Application of Chemistry in Oil and Gas Well Fracturing", at pages 59-60.

Conventionally, the fracturing industry has preferred a gellant system suitable for fracturing which forms a gel in less than 30 seconds and preferably less than 20 seconds so as to be able to be prepared immediately before fracturing. Typically, gellant is added to the hydrocarbon and the hydrocarbon is then rapidly passed through a proppant tank, "on the fly", where the hydrocarbon must have sufficient viscosity to pick up and hold the proppant in the fracturing fluid for injection into the wellbore. Preferably the gellant is cost effective and relatively simple to produce, is a liquid for ease of handling, is stable over a broad range of temperatures and can be broken when desired to permit flowback to the wellbore. Many known aluminum-based gellant systems are solids which require significant time to solubilize in the hydrocarbon and often, the application of heat, before gelling occurs. Thus, these systems cannot be used to prepare fracturing fluids "on the fly".

Typically, hydraulic fracturing can be performed using either oil-based fluids or water-based fluids. It is known, for oil-based fluids, to develop viscosity using organometallic compounds to cross-link fatty acids or phosphate esters. For water-soluble fracturing fluids, the development of viscosity can be achieved by using organometallic compounds to cross-link naturally occurring polysaccharides, such as modified cellulose products (hydroxyethyl cellulose (HEC) and carboxymethyl hydroxyethyl cellulose (CMHEC)), guar and derivatized guar or derivatized xanthan gum. Typically, cross-linkers for oil-based gels are aluminum or iron and for water-based gels would be borates, zirconates or titanates.

Upon completion of the fracturing job, the gelled fluid must be returned to a natural fluid state so as not to cause formation damage by leaving gelled material in the pore spaces of the formation rock which would thereafter impede the flow of liquid or gaseous hydrocarbons out of the wellbore. Accordingly, breaker additives are used. One of the most common problems experienced with gelled fluids is the inability of the gels to break cleanly and to flow back out of the formation once the proppant is set and the pressure is released at surface. The breaking or drop in viscosity is typically achieved by the addition of the breaker additives into the fracturing fluid package. The breaker additives frequently work by oxidation, counter ions or pH or a combination thereof and may be time delayed so as to allow the fracturing job time to complete before the gel is broken.

The use of oil-based fracturing fluids has grown in popularity due to the presence of sensitive clays in some hydrocarbon bearing formations which react adversely with water in water based fracturing fluids. Oil-based fluid fracturing is more expensive than water-based fluid fracturing, but is less likely to cause formation damage due to swelling of the sensitive clays that may be in the formation.

Prior to 1970, the oil and gas industry employed the use of various types of surfactant and fatty acid-organometallic salts to viscosify hydrocarbon fluids for hydraulically fracturing hydrocarbon-bearing formations. The industry eventually changed to phosphate ester-based chemistry in an attempt to address shortcomings with the fatty acid technology of the time which were primarily related to economics of having to supply heat which is costly, especially in the colder climates including Canada and Russia and the slower than required speed at which gels formed. Thus, the current state in the industry is one in which the majority of oil-based fracturing fluids are viscosified with phosphorus-based chemistry; more specifically, fluids are viscosified using phosphate esters that have been cross-linked with aluminum or iron-based organometallic compounds.

Phosphate esters are commonly used, in combination with a metal cross-linker or activator such as an iron or aluminum salt, to gel hydrocarbons for use as a fracturing fluid. Following fracturing, broken gels are flowed back from the well and ultimately combine with crude streams for sale to refineries. The flowback fluids typically contain residual oil-soluble phosphate esters. Some phosphorus esters exhibit volatility when heated above 250° C., thus when crude containing phosphate esters is distilled in the refinery by heating to approximately 340° C., ester hydrolysis can occur, resulting in the formation lower molecular weight phosphorus compounds that vaporize and distill up the crude tower. Fouling within the towers, exchangers, and furnaces has been linked to the decomposition, hydrolysis and deposition properties of the phosphate esters. Volatile phosphorus is defined as the phosphorus content measured in a distilled fraction. Analysis of foulants removed from distillation towers and furnaces, typically has shown high levels of phosphorus (up to 10%) resulting in:

fouling in jet draw trays within the crude tower resulting in throughput restrictions;

foulant accumulation in pre-flash tower leading to fractionation problems; and high furnace Tube Metal Temperatures (TMT), in both atmospheric and vacuum furnaces leading to equipment shutdowns.

Over the last ten years, tower fouling associated with fracturing fluid use has been of increasing concern. There have been periods when it appeared that tower fouling had subsided however recent experience suggests an alarming increase in both phosphorus content in refinery feed and plant fouling. Detailed investigations by the industry determined that residual dialkyl phosphate esters (DAPE) present in marketed mixed sweet blend crude was the primary cause of fouling.

While phosphate esters have been employed as gellants within the industry since the early 70's, fouling of refinery equipment appears to be a cumulative effect and only recently, after years of use, has evidence been uncovered that points to throughput limitations. It is the opinion of the industry that the following factors have combined to impact refinery operability:

increased use of oil-based fracturing fluids;
increased volume of flowback fluids to crude,
changes in gellant/activator chemistry, and
attempts to extend refinery run lengths.

Further, the use of various organometallic compounds has been found to provide gels that are not stable under reservoir conditions. Problems are particularly prevalent where a significant amount of water is present. Generally, the phosphate-based systems do not satisfactorily perform the desired cross-linking function in the presence of more than about 1200 ppm of water. Further, aluminum cross-linked phosphate ester gels do not perform well where the pH is outside a relatively narrow range.

A number of potential solutions have been proposed, including various alternatives for reducing and/or removing phosphorus from produced crude, as well as employing newly developed low-volatility phosphorus-based additives.

One such solution is to promote use of water-based fracturing which does not utilize phosphorus-based material for the most part. Others have suggested the development of "low-volatile" phosphorus-based gellant systems, utilizing molecules that are less susceptible to high temperature hydrolysis and thus limiting the amount of volatile phosphorus-containing components that transport up the refinery towers. U.S. Pat. No. 7,066,262 to Funkhouser teaches that volatile phosphorus compounds are more related to residual triethyl phosphate ester content of the gelling system rather than thermal instability of the phosphate ester gellants themselves.

Some of the "low volatile" systems suggested are more correctly phosphonate-based systems rather than phosphate ester-based systems. Phosphonate-based components have long been noted as being more stable at high temperature than phosphate ester-based chemistries and, as a result, phosphonate-based molecules have been recommended, for example, in high temperature scale inhibitor work, where historically phosphate ester-based molecules have been shown to be ineffective because of instability at the higher application temperatures.

Historically, U.S. Pat. No. 3,799,267 to Ely et al. and U.S. Pat. No. 4,981,608 to Gunther teach use of fatty acid soaps with metallic compounds for increasing the viscosity of hydrocarbon fluids. Both yield end products that are essentially solid at room temperature and do not meet the preferred requirements of end users for "on the fly" fracturing applications. Many fatty acid organometallic gelling systems currently available on the market, such as from H. L. Blachford Ltd., Mississauga, Ontario, Canada, are only available in a powder form and many require heat to initiate the gelling process. The fatty acid based gellant compounds typically have application in the manufacture of inks and greases and have achieved little market penetration to date into the upstream oil and gas industry. CALFORD® 760, available from H. L. Blachford Ltd., is listed as being an aluminum octanoate which does not require heat to initiate gelling, however the gelling time is well over 3 minutes. Thus, while applicable to hydrocarbon fluids, such compounds are not a practical substitute for phosphorus-based gellant systems.

Further, U.S. Pat. No. 3,799,267 to Ely et al. also teaches the addition of an aromatic acid such as benzoic acid to increase the rheological properties of the gel that is formed by the invention. However, the rate of gellation is limited by the speed at which the solid aluminum soap dissolves in the hydrocarbon fluid and, even though it was postulated that this time could be shortened by the addition of oil-soluble aliphatic acids, no attempt to quantify or claim this enhancement was made. Similarly, U.S. Pat. No. 3,900,070 to Chatterji et al. teaches that di-salts of aluminum 2-ethylhexanoate can be used for gellation of hydrocarbon fluids but the result of using this invention was that gellation times were in excess of 1 hour, mainly due to the lower solubility of the gellant.

U.S. Pat. No. 3,791,972 to Myers et al. teaches that a mixture of aluminum complex soap species can be used for gelling hydrocarbons that are used for the manufacture of lubricating greases. The aluminum complex soaps of this invention were made using an aromatic carboxylic acid and a higher fatty acid which had been reacted sequentially with an aluminum alkoxide. This complex soap mixture was then dissolved in a hydrocarbon to which isobutylene polymer was added. In the case of both Myers et al. and Ely et al., the benzoic acid component of the aluminum soap is critical in terms of rate of dissolution and the resultant gel's rheological properties. In neither case could the invention gel fast enough to be able to satisfy the criteria of "on-the-fly" gellation for practical hydraulic fracturing.

U.S. Pat. No. 6,149,693 to Geib teaches the addition of an alkoxylated amine-based "enhancer" to the invention described in U.S. Pat. No. 5,614,010 to Smith et al. so as to achieve greater gel strengths and quicker gel times. These two patents highlight that phosphate ester-based gelling systems are susceptible to loss of gel strength under certain operating conditions and may have issues with speed of gellation for proper application.

Applicant believes that the systems described thus far encompass the majority of commercially available hydrocarbon gelling systems used by the industry.

Various problems have been encountered with gelled fluids in oilfield applications, including the lack of thermal stability of the fracturing fluids, typically caused by the degradation of the additives or the instability of the gel upon exposure to high temperatures and/or high shear stress conditions. Lack of thermal stability, typically as a result of high temperatures, can result in changes in the rheological properties of the gel, which may ultimately affect the ability of the fluid to suspend the proppant material. If the proppant material is prematurely lost from the fracturing fluid, it can have a detrimental effect on the fracturing treatment. Further, gel instability can result in higher loss of fluid into the formation, diminishing the amount of fracturing that occurs and potentially causing damage to the formation.

U.S. Pat. No. 6,248,699 to Subramanian et al. describes the use of an organometallic salt coupled with an activator, a difunctional or trifunctional carboxylic acid. The activator is used in an attempt to shorten the gelling time. The preferred embodiment is a symmetrical tri-salt of aluminum-2-ethylhexanoate coupled with a dimer-trimer fatty acid which is claimed as being able to from a gel from about 1.5 to about 3 minutes. Subramanian et al. suggest that either aluminum isopropoxide or oxoaluminum acylate may be used however Applicant believes that while aluminum isopropoxide results in a liquid product according to the process described therein, use of oxoaluminum acylate does not, the product being a solid. Applicant believes that embodiments of this gelling system have not achieved any practical use in oil and gas fracturing, possibly due to the following observed short-comings;

the process of manufacture is cumbersome as the product must be manufactured under nitrogen at elevated temperatures;

the product requires approximately 1 minute or more to achieve maximum gel strength; and the resultant gel is not of sufficient strength to effectively carry large amounts of proppant into deep wells.

Overall, non-phosphorus based chemistries have achieved little attention in the industry because, to date, they have typically suffered the following disadvantages:

require heat to initiate the gellation process;

are extremely difficult to handle in the field either because they are powders or very viscous liquids, or in some cases are solids;

time taken for the gel to reach its maximum strength is too long for practical applications, being in excess of 30 seconds;

cannot achieve the desired gel strengths to effectively carry sufficient quantities of proppant material into the fractures; and gels weaken considerably at elevated temperature, thus limiting the applicability for use in shallow formations.

Recently it has been proposed that oil companies operating in Canada be taxed a levy should produced fluids contain greater than 1.5 ppm phosphorus. Thus, there is great interest in developing fracturing fluids which contain low to no volatile phosphorus and which can be added to fluids and proppant immediately prior to injection into the wellbore.

An ideal solution to the known problems of phosphorus-based technologies is to employ non-phosphorus-based gellant chemistries for use in fracturing systems. Thus, there is great interest in the industry to develop non-phosphorus-based systems which rapidly form gels in oil-based fluids, preferably in less than 30 seconds and more preferably in less than 20 seconds, which are temperature stable and strong enough to carry proppant and which are readily broken using breaking agents to permit hydrocarbons to flow to the wellbore without causing plugging or formation damage.

SUMMARY OF THE INVENTION

A substantially liquid gellant is formed as one or more reaction products having an asymmetrical structure. The gellant is capable of gelling a base hydrocarbon fluid in less than 30 seconds and due to its liquidity permits mixing a fracturing fluid "on the fly" to reliably carry proppant into a formation.

In embodiments of the invention, the reaction takes place in the presence of an ester which acts to drive the reaction to form the asymmetrically structured reaction products. Applicant has found that lauric acid is an exemplary fatty acid for use in the reaction and small amounts of formic acid, when added as a rheology modifier, keep the reaction products in the liquid state for extended periods of time.

In a broad aspect of the invention, the substantially liquid non-phosphorus gellant for gelling a fracturing fluid comprises: one or more reaction products resulting from the reaction of a metal salt, being a metal carboxylate salt or metal carboxylate amine salt having carboxylate groups ranging from about C5 to about C54; one or more organic acids; and an ester, the ester selected to match at least a smaller carboxylate group on the metal carboxylate salt or metal carboxylate amine salt; and an effective amount of a rheology modifier sufficient to preferentially interact with the one or more reaction products for preventing interaction between the one or more reaction products so as to substantially prevent solidifying of the one or more reaction products until such time as the substantially liquid gellant is mixed in the fracturing fluid in which an activator is present; wherein the one or more reaction products are substantially asymmetrical in structure.

In an embodiment of the invention, the metal salt is oxoaluminum acylate; the ester is isopropyl hexanoate ester; the organic acids are a $C_6$ to about $C_{18}$ fatty acid and 2-ethylhexanoic acid and the one or more reaction products are a mixture of aluminum di-2-ethyl hexanoate-fatty acid ester complex and hydroxyl aluminum di-2-ethyl hexanoate.

In a further broad aspect of the invention and in use to form a fracturing fluid, a hydrocarbon fracturing fluid comprises: a hydrocarbon base fluid; a gellant comprising one or more asymmetrical reaction products formed from the reaction of a metal salt, being a metal carboxylate salt or metal carboxylate amine salt having carboxylate groups ranging from about C5 to about C54; one or more organic acids; an ester, the ester selected to match at least a smaller carboxylate group on the metal carboxylate salt or metal carboxylate amine salt; and an effective amount of a rheology modifier sufficient to preferentially interact with the one or more reaction products for preventing interaction between the one or more reaction products so as to substantially prevent solidifying of the one or more reaction products; and an effective amount of one or more activators for preferentially interacting between the one or more reaction products for promoting gelling of the hydrocarbon fluid, wherein the gellant causes the hydrocarbon fluid to gel in less than about 30 seconds.

DETAILED DESCRIPTION OF THE PREFERRED EMBODIMENT

According to embodiments of the invention, unlike Subramanian et al., the use of unsymmetrical organometallic salts permit gellants to be produced which do not contain phosphorus which are liquid, for ease of handling, which gel in less than 10 seconds and which can be produced without a requirement for high temperature or the need for nitrogen to meet the "on the fly" demands of the industry. For example, a liquid gellant is prepared in advance and is easily mixed with hydrocarbon base oil fracturing fluids as they are passed by a charge of proppant. Fast gelling times enable the gelled fracturing fluid, which incorporates gellant according to embodiments of the invention, to pick up and hold the proppant for delivery down a wellbore for fracturing.

In embodiments of the invention, a substantially liquid gelling agent or gellant comprises a metal carboxylate salt or metal carboxylate amine salt, having carboxylate groups ranging from about $C_5$ to about $C_{54}$ and, in one embodiment, from about $C_6$ to about $C_{18}$ carbon atoms.

As one skilled in the art would appreciate, the reaction product of embodiments of the invention could utilize various types of carboxylate anions in combination with the metal cation. Although the prior art makes mention of various types of carboxylate metal soaps, embodiments of the invention relate to a process for ensuring that these molecules are asymmetrical in structure. The asymmetry of the soap molecules is expected to behave in a similar manner to phosphate ester-based gellants for the creation of strong 3-D gel networks in hydrocarbon fluids, without the need for high temperatures, to have suitable rheology for "on-the-fly" hydraulic fracturing applications.

The advantages in the prior art of using asymmetrical phosphorus-based gelling agents, with respect to gel strength and speed of gellation, have been well documented, however to Applicant's knowledge, these advantages have never been investigated with respect to asymmetrical fatty acid based soaps nor have there been any teachings to produce a reaction product comprising substantially asymmetrical fatty acid soap molecules.

Applicant has found that the asymmetry of the soap molecules, according to embodiments of the invention, are guided by the presence of a buffering ester. The ester was chosen to match a smaller carboxylate group that is to be bonded to the metal. Thus if 2-ethylhexanoic acid is chosen as the smaller carboxylate group then a 2-ethylhexanoate ester is used to buffer the reaction to ensure asymmetry of the molecules formed. One skilled in the art would recognize that there are a series of carboxylic acid/carboxylate ester combinations suitable for use without departing from the scope of the invention.

In one embodiment, the reaction is performed with one to two moles of organic acid and one mole of metal salt in the presence of the ester, the metal salt preferably containing a mixture of di-salt and tri-salt. The reaction is performed using 1 mole of 2-ethyl hexanoic acid and from about 0.1 mole to about 1 mole of tallow fatty acid with 1 mole of a metal acylate, and about 0.01 mole to about 1 mole of aliphatic amine in the presence of an effective amount of a octanoate ester.

It is postulated that the presence of the ester drives the reaction so as to ensure the maximum yield of non-symmetrical di-salts and tri-salts rather than the symmetrical salts which have historically resulted in weak gels and difficulties in solubilising, depending upon the nature of the organic acids used.

It is further postulated that the reaction product of embodiments of the invention contain either one or more of the following species;

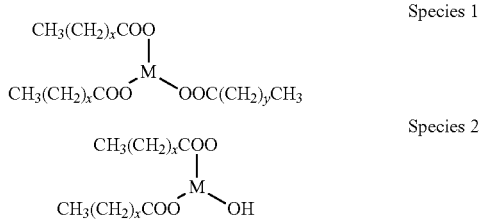

wherein x and y are from about 5 to about 54, and preferably from about 6 to about 18; and M is a multivalent metal such as aluminum, iron, cobalt, zirconium and so forth, mixtures thereof, or an oxo-metal or metal alkoxide complexed to a fatty acid.

In one embodiment the metal is aluminum and preferably an oxoaluminum acylate, based on octanoic acid.

Applicant believes that at least two of the hypothetical species formed result in a non-uniform 3-D structure which is capable of increased hydrogen bonding, thus substantially mimicking the phosphate ester gellants. This is in direct contradistinction to Subramanian et al which teach substituting all three groups on the metal salt with carboxylic acid groups, preferably by reaction with 2-ethylhexanoic acid, the resulting product being a symmetrical organometallic salt. The non-symmetrical nature of the salts, formed according to embodiments of the present invention, provide the reaction product with two important attributes, which have to Applicant's knowledge not been reported in the literature, the attributes being:

good solubility in hydrocarbon fluids, meaning the reaction product dissolution is not a rate determining step for gellation; and improved gel strength due to increased hydrogen bonding in 3D similar to that observed when phosphate ester-based organometallic gellant systems are used.

In one embodiment, an oxoaluminum acylate based on octanoic acid is used instead of the aluminum isopropoxide taught by U.S. Pat. No. 6,248,699 to Crompton Corporation, the entirety of which is incorporated herein by reference. Applicant believes that the reaction will take place at a broad range of temperatures however the speed of the reaction will be much slower at temperatures approaching room temperature.

In one embodiment, Applicant has found an optimal temperature for the reaction to be about 60° C. Further, Applicant's reaction does not require the use of nitrogen. Reactions have been successfully performed at temperatures up to about 120° C.

The gelling agent is prepared by heating the metal salt with one or more organic acids in the presence of an ester. The metal salt is heated with one or more organic acids, preferably a $C_8$ and a $C_{16-18}$ organic acid, and a primary aliphatic amine in the presence of an ester. The metal salts are preferably multivalent and may be complexed with one or more anions, such as oxo anions, carboxylate, sulphonate, sulphates, and so forth. In one embodiment, the $C_{16-18}$ fatty acid is a tallow fatty acid and an organic acid is 2-ethylhexanoic acid. The ester present in the reaction is a hexanoate ester, preferably an isopropyl hexanoate ester.

In one embodiment, one mole of $C_{16-18}$ fatty acid, such as tallow fatty acid, is reacted with oxoaluminum acylate and 1 mole of 2-ethyl hexanoic acid in the presence of an effective amount of isopropyl hexanoate ester, sufficient to drive the reaction to form asymmetrical salts, at temperatures of about 60° C. which results in a reaction product which when mixed with an oil such as diesel, gels the oil in less than 10 seconds.

Further, it has been found that increasing the ratio of the tallow fatty acid, from between about 0.3 mole to about 1 mole, imparts greater elasticity the higher the concentration of tallow fatty acid used. It is postulated that the addition of the $C_{16-18}$ fatty acid group provides greater hydrophobicity and permits the reaction product to interact with more oil due to the longer chain length, which leads to a gel with greater elasticity. Despite the rapid gelling and the greater elasticity, however, the reaction product solidified within 1 to 2 days after the reaction was complete.

Applicant believes that the structures present are a mixture of aluminum di-2-ethyl hexanoate-tallow fatty ester complex and hydroxyl aluminum di-2-ethyl hexanoate as follows:

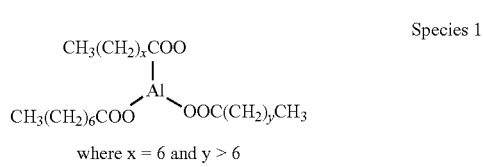

-continued

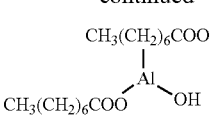
Species 2

Applicants have found that incorporation of a rheology modifier that preferentially interacts with the gellant reaction products prevents interaction between the various reaction products themselves, when added into the reaction once it has started, which substantially prevents solidifying of the gellant. One such suitable rheology modifier is a secondary amine such as diethylamine (DEA). Alternatively formic acid may be used. Applicant believes that suitable rheology modifiers may act by inhibiting hydrogen bonding between the reaction product species. Further, Applicant believes that exemplary rheology modifiers are those which, when the gellant is mixed with the hydrocarbon base oil containing an activator, permit preferential interaction between the reaction products and the activator for permitting gelling of the fracturing fluid.

It is postulated that the DEA hinders formation of a gel network in the gellant itself, but as soon as the gellant is added to oil, the gel being typically being about 3-5% of the volume of the oil, the resulting dilution of the DEA makes the effect of the DEA inconsequential. Incorporation of the amine into the reaction has no adverse effects on the gelling time of the hydrocarbon fracturing fluid, the gel times remaining less than 10 seconds.

In an embodiment of the invention, formic acid was used as the rheology modifier to inhibit solidification of the reaction products. Formic acid was capable of substantially preventing solidification over longer periods of time than DEA. Applicant has postulated that formic acid prevents the hydroxyl groups on the reaction products from further reacting and losing the hydrogen by providing an acidic environment.

In one embodiment, the gelling agent is formed by heating 2-ethyl hexanoic acid, tallow fatty acid, oxoaluminum acylate and diethylamine in from about a 1:1:1:0.15 molar ratio to about a 1:0.3:1:0.15 molar ratio, respectively, in the presence of an effective amount of isopropyl hexanoate ester.

In an embodiment of the invention, a lower molecular weight fatty acid, such as dodecanoic or lauric acid was used to replace the tallow fatty acid. Applicant has found that the lower molecular weight fatty acid gave a faster vortex closure time indicating a greater affinity for the aluminum molecule due to an increased charge density on the lauric acid. This resulted in a greater bond strength within the reaction products when in the presence of conventional breakers, such as slurried magnesium oxide, and heat, avoiding premature breaking of the gel.

Further, Applicant has found that use of a more consistent and purer product, such as a distilled $C_{12}$ fatty acid (lauric acid), available as PRIFAC 2922, from Uniqema Chemicals Limited, United Kingdom, avoids variances found in natural products and improves the premature break profile seen with some tallow fatty acid aluminum reaction products.

In one embodiment, the asymmetrical gelling agent or reaction product is formed by heating 2-ethyl hexanoic acid, lauric acid, oxoaluminum acylate and formic acid from about a 1:1:1:0.008 molar ratio to about a 1:0.3:1:0.008 molar ratio, respectively, in the presence of an effective amount of isopropyl hexanoate ester.

In Use

The resulting substantially liquid gellant can be added directly into hydrocarbon oil or mixtures of oils with addition of proppant immediately prior to injection into a wellbore for forming a fracturing fluid. There are a wide array of suitable hydrocarbon fracturing oils currently available and which may be used, such as diesel, kerosene, FO 200, Max Frac, PWC 150, all available from Innovative Chemical Technologies Canada (ICTC), Calgary, Alberta, Canada. The substantially liquid gellant is generally added to the hydrocarbon oil in amounts less than 15% by volume and preferably less than 10% by volume of the hydrocarbon oil.

In embodiments of the invention and further to encourage gelling of the hydrocarbon oil in less than 30 seconds, at least one activator may be added to the hydrocarbon oil/gellant according to embodiments of the invention. Activators are typically dimer fatty acids, trimer fatty acids, mixtures of dimer and trimer fatty acids, aromatic diacids and the like and polar solvents, such as water.

In one embodiment, two activators are added, preferably a dimer fatty acid, such as a $C_{36}$ dimer acid and water. As most hydrocarbons used for preparation of fracturing fluids are wet, it may be that only the dimer fatty acid is added.

In embodiments of the invention, the dimer acid activator is added to the hydrocarbon oil and gellant in amounts less than 5% by volume and preferably less than 1%. If water is added to the hydrocarbon oil and gellant, it is added in amounts less than 10% by volume and preferably less than 1%. In one embodiment, the dimer acid and water are added at a concentration of 0.2% and 0.5% by volume respectively.

In an embodiment of the invention, and to encourage gelling in less than 30 seconds, at least one additional activator was added. Applicant has found that one such suitable activator is a commercially available blend, NPA 012, available from Innovative Chemical Technologies Canada (ICTC), Calgary, Alberta, Canada.

Other conventional additives which may be added to the fracturing fluid according to embodiments of the invention, include, but are not limited to, demulsifiers, wetting agents, foaming additives, $H_2S$ scavengers and the like. The type of oil selected and the additives added may affect the gelling time as will be appreciated by those skilled in the art.

Diluents, such as diesel or xylene may be added to the gellant to aid with pumpability, as is well known in the art.

Conventional breakers for hydrocarbon fracturing fluids, such as slurried magnesium oxide, are effective at breaking gels created by embodiments of the invention. Further, variation in pH and use of oxidizing mechanisms, well known in the industry for breaking gels, have been used with the novel gellant system according to embodiments of the invention, with good success.

While primarily used as a gelling system for use in fracturing, embodiments of the invention may also be used in wellbores for water control and for loss circulation control and the like.

EXAMPLES

The following examples are illustrative of the invention and are not meant to limit the scope of the invention, as may be appreciated by one of skill in the art.

Example 1

Example 1 illustrates the simplicity of production of a gellant according to an embodiment of the invention and the efficiency of the product for gelling a hydrocarbon fluid, their reaction product as well as the gelling efficiency of the system.

The following reactants were added to a 2 oz French Square and the mixture was placed in a 60° C. water bath and occasionally agitated for 15 minutes to mix in the tallow fatty acid, which is a solid at room temperature:

6.97 g oxoaluminum acylate;
9.63 g isopropyl hexanoate ester;
7.4 g 2-ethylhexanoic Acid;
10.4 g diesel (as diluent); and
5.4 g distilled tallow fatty acid.

After 15 minutes, 0.3 g diethylamine was added to the mixture and agitated until fully mixed in the system. The mixture was left in the 60° C. water bath for a further 105 minutes.

Gelling characteristics were visually measured by adding the products to a 500 ml Waring Blender containing about 200 mL hydrocarbon or frac oil to be gelled, such as diesel and FO 200 (available from ICTC, Calgary, Alberta, Canada). The blender is set at 50% of it's maximum speed using a rheostat. Activators, dimer acid and water were added following the addition of the gellant to the hydrocarbon oil and the time required for the vortex to close was measured as being indicative of gelling.

TABLE A

| % Reaction Product | Frac Oil Type | % Water | % Dimer Acid | Vortex Closure Time |
| --- | --- | --- | --- | --- |
| 5 | Diesel | 0.5 | 0.2 | 10 seconds |
| 5 | FO 200 | 0.5 | 0.2 | 7 seconds |

One of skill in the art would understand, as shown in Table A, the gellant produced is extremely efficient at gelling fracturing oils, particularly diesel and FO 200.

Example 2

The temperature stability of gels formed using gellants according to embodiments of the invention were compared to gels formed using conventional phosphate ester gellants.

An aluminum gellant according to an embodiment of the invention was mixed as per example 1 with diesel. A known phosphate ester gellant was mixed with fracturing oils, HGA 48 and HGA 37, available from Clearwater Engineered Chemistry™ of Houston, Tex., USA, according to manufacturers' specifications. The gels were prepared in 160 ml medicine bottles and placed in a water bath at 80° C. A further identical test was performed for each gellant at room temperature.

In a visual test, Applicant's gel at 80° C. looked and behaved like the same as a gel using phosphate ester at room temperature, whereas the phosphate ester gel at 80° C. flowed more easily and acted more like a viscous liquid rather than a gelled fluid.

One of skill in the art would appreciate that gels according to embodiments of the invention have greater stability at elevated temperature than conventional phosphate ester system.

Example 3

Prior Art

Experimentation was performed to determine the effect of temperature on the preferred products made according to U.S. Pat. No. 6,248,699 to Crompton Corporation. An aluminum-tri-salt was used as the starting materials and free fatty acid added solely to improve flow characteristics only and was not reacted with the reactants according to the procedure described therein.

The reaction product was manufactured as per Procedure 1 of the Crompton patent reproduced below. The reaction temperatures used were 95° C., as recommended by Crompton and 80° C. Applicant compared the gel times for each reaction product to assess whether the Crompton product could be manufactured at a lower temperature.

As set forth in U.S. Pat. No. 6,248,699:

"Procedure I

Preparation of Aluminum-Tri-Salt with Free Fatty Acid

A flask of 325.5 g (54%) of 2-ethylhexanoic acid was fitted with a power stirrer, a condenser and a nitrogen inlet. Aluminum isopropoxide, 153 g (26%), was added in parts over a 1 hour period. The resulting viscous mixture was stirred under nitrogen at 95° C. for approximately 2 hours. The fatty acid, i.e. 57.6 g (10%) palmitic acid (Hystrene.RTM. 9016), was added and stirring was continued for 1 hour at 95° C. Toluene, 10%, was added to the final product. The product was bottled and tested for gelling."

Table B shows the concentration of additives and the resulting gelling time.

TABLE B

| (Prior Art) | | | | |
| --- | --- | --- | --- | --- |
| Reaction Temperature | % Reaction Product | % Water | % Dimer Acid | Vortex Closure Time |
| 80° C. | 3.0 | 0.1 | 0.1 | >180 seconds |
| 95° C. | 3.0 | 0.1 | 0.1 | 180 seconds |

Of note, Applicant has observed when water as activator was added at the concentration in Table B above a white precipitate was observed. Applicants' postulate this may be due to precipitation of portion of the aluminum complex formed during the reaction process.

One of skill in the art would appreciate, as shown in Table B, that a drop in temperature of 15° C. from the suggested reaction temperature increases the gelling time of Crompton's gellant to greater 3 minutes. Thus, temperatures in excess of 80° C. are required for Crompton's reaction to take place, whereas Applicant's is operative at lower temperature, about 60° C.

Example 4

Applicant has experimented with varying the concentrations of activators, such as dimer or dimer/trimer acids, to gellant/hydrocarbon oil mixtures. The dimer acid used was Unidyme® 12, available from Arizona Chemical of Jacksonville, Fla., USA, which is a high purity dimer acid. The dimer/trimer product used was Unidyme® 60, also available from Arizona Chemical and which has a 35:65 dimer/trimer ratio.

The gellant, according to embodiments of the invention and described in Example 1, and the above identified activators were added to diesel in bottles. The bottles were shaken until the fluid contained therein gelled. Water was added as an additional activator as described in Example 1. A crude assessment of elasticity or brittleness of the resulting gel was observed by tipping each bottle upside down.

TABLE C

| Additive | Concentration (%) | Elastic/Brittle Observation |
|---|---|---|
| Unidyme 60 | 0.1 | Elastic |
| Unidyme 60 | 0.2 | Elastic |
| Unidyme 60 | 0.3 | Brittle |
| Unidyme 12 | 0.1 | Elastic |
| Unidyme 12 | 0.2 | Elastic |
| Unidyme 12 | 0.3 | Brittle |

One of skill in the art would appreciate, as shown in Table C, that increasing the concentration of the dimer and/or trimer acid above about 0.2% is detrimental to the fluid properties of the system.

Example 5

Experimentation was performed to investigate the effect of adding varying concentrations of activating water to the gellant/oil mixes. The gellant was prepared as in Example 1 and the same concentrations of gellant and dimer acid were used as in Example 1.

TABLE D

| Water Concentration (%) | Gelling Time | Elastic/Brittle Observation |
|---|---|---|
| 0.1 | >30 seconds | Elastic |
| 0.2 | 30 seconds | Elastic |
| 0.3 | 25 seconds | Elastic |
| 0.4 | 20 seconds | Elastic |
| 0.5 | 10 seconds | Elastic |

Applicant noted that as the water concentration was increased to 0.5% there was a trend of increasing elasticity observed visually in the gelled fluid.

One of skill in the art would appreciate, as shown in Table D, that the gel characteristics are not altered by the amount of water added however increasing the water concentration decreased the gelling time.

Example 6

Applicant tested the effect on the gelling efficiency when a fatty acid is reacted with acid and metal salt. Accordingly, 0.4 mole of tallow fatty acid was added per 1 mole of 2-ethyl hexanoic acid. Two reactions were performed side-by-side, one without and one with the tallow fatty acid and according to Example 1. Testing for gelling was also performed as per Example 1.

TABLE E

| Raw Materials | Reaction Product 1 | Reaction Product 2 |
|---|---|---|
| Oxoaluminum acylate | 6.55 g | 6.97 g |
| isopropyl hexanoate ester | 9.05 g | 9.63 g |
| 2-Ethyl Hexanoic Acid | 13.8 g | 7.4 g |
| Tallow Fatty Acid | — | 5.4 g |
| Diesel (diluent) | 10.5 g | 10.4 g |
| Observation after 2 hours | Liquid | Viscous Liquid |
| Gel Time | 30 seconds | 7 seconds |
| Observation after 2 Days | Liquid | Solid |

Applicant noted for Reaction Product 2 that reaction with a fatty acid substantially decreased the gelling time, however without the addition of diethylamine the reaction product does solidify after two days.

One of skill in the art would appreciate, as shown in Table E, incorporation of tallow fatty acid in Reaction Product #2 improves the gelling efficiency when compared to 2-ethyl hexanoic acid alone. It is postulated that this observation is related to the asymmetry of the molecules that for as opposed to the symmetrical di-salts and tri-salts produced by the prior art.

Example 7

Applicant has tested the effect of the addition of diethylamine for substantially inhibiting solidifying of the reaction product. Two separate reactions were performed side-by-side, one without and one with diethylamine, and tested for gelling as per Example 1.

TABLE F

| Raw Materials | Reaction Product 1 | Reaction Product 2 |
|---|---|---|
| Oxoaluminum acylate | 6.97 g | 6.97 g |
| Isopropyl hexanoate ester | 9.63 g | 9.63 g |
| 2-Ethyl Hexanoic Acid | 7.4 g | 7.4 g |
| Tallow Fatty Acid | 5.4 g | 5.4 g |
| Diethylamine | — | 0.3 g |
| Diesel (diluent) | 10.4 g | 10.4 g |
| Observation after 2 hours | Viscous Liquid | Liquid |
| Gel Time | 7 seconds | 7 seconds |
| Observation after 2 Days | Solid | Liquid |

One of skill in the art would appreciate the addition of diethylamine in Reaction product #2 substantially inhibits the reaction product from solidifying, without affecting the gelling properties.

Example 8

Applicant has tested the effect of using an ester in the gellant reaction matrix on the gelling properties of the final reaction product as well as to support the postulation that the final reaction product is not a random mixture of aluminum complex soaps as taught by the prior art, such as Myers et al.

For this example, aluminum isopropoxide was treated in the same manner as in Example 1 with the exception being that a mixture of mineral oil and isopropyl alcohol is substituted for the isopropyl hexanoate ester. The reactants, as shown in Table G, were added to a 2 oz French Square and the mixture was placed in a 60° C. water bath and occasionally agitated for 15 minutes to mix.

TABLE G

| Raw Materials | Reaction Product 1 | Reaction Product 2 | Reaction Product 3 |
|---|---|---|---|
| Aluminum Isopropoxide | 1 mole | 1 mole | 1 mole |
| 2-Ethyl Hexanoic Acid | 2 moles | 3 moles | 2 moles |
| Tallow Fatty Acid | — | — | 1 mole |

The reaction products were removed from the waterbath at 2 hours and again after 27 hours and the gelling properties measured per Example 1. The extended reaction time was used to ensure that the reaction was fully completed.

TABLE H

| Reaction Product | % Reaction Product | % Water | % Dimer Acid | Vortex Closure Time |
|---|---|---|---|---|
| 1 | 5.0 | 0.5 | 0.2 | >60 seconds |
| 2 | 5.0 | 0.5 | 0.2 | >60 seconds |
| 3 | 5.0 | 0.5 | 0.2 | >60 seconds |

One of skill in the art would appreciate, as shown in Table H, the gelling times all exceed 60 seconds, illustrating that Applicants' reaction product is not a random mixture of aluminum soaps, but rather a specifically designed mixture of asymmetrical di-salts and tri-salts formed primarily due to the presence of the ester in the reaction matrix.

Example 9

Experimentation was performed to determine the effect of the stability of the fatty acid-aluminum acylate reaction product by substituting different molecular weight fatty acids for tallow fatty acid on an equal molar ratio.

This study was performed to determine if it was possible to produce a fatty acid aluminum acylate complex with greater stability in the presence of magnesium oxide, the most common conventional breaker utilized in commercial fracturing fluids.

By measuring the vortex closure time, it was possible to assess the affinity of the fatty acids for aluminum acylate. A faster vortex closure time is indicative of a stronger affinity for the aluminum acylate molecule.

TABLE I

| Additives | 1 | 2 | 3 | 4 | 5 |
|---|---|---|---|---|---|
| Aluminum Acylate | 5.8 g | 5.8 g | 5.8 g | 5.8 g | 5.8 g |
| Isopropyl Hexanoate | 4.2 g | 4.2 g | 4.2 g | 4.2 g | 4.2 g |
| 2-Ethyl Hexanoic Acid | 4.5 g | 4.5 g | 4.5 g | 4.5 g | 4.5 g |
| Lauric Acid | 2.5 g | — | — | — | — |
| Myristic Acid | — | 2.85 g | — | — | — |
| Palmitic | — | — | 3.2 g | — | — |
| Tallow Fatty Acid | — | — | — | 3.5 g | — |
| Behenic Acid | — | — | — | — | 4.24 g |
| Diethylamine | 0.21 g | 0.21 g | 0.21 g | 0.21 g | 0.21 g |
| ENVIRODRILL* | 12.7 | 12.35 | 12.0 | 11.7 | 10.96 |
| Vortex Closure Time | 7 s | 15 s | 20 s | 15 s | 35 s |
| % Reaction Product | 5 | 5 | 5 | 5 | 5 |
| % Activator Blend | 0.9 | 0.9 | 0.9 | 0.9 | 0.9 |

*ENVIRODRILL ™, ICTC, Calgary, Canada

One of skill in the art would appreciate, as shown in Table I, that lauric acid has the greatest affinity for aluminum acylate as shown by the shortest vortex closure time and hence a stronger and more stable bond.

Example 10

Experimentation was performed to compare the performance of a tallow fatty acid reaction product and a lauric acid reaction product, according to embodiments of the invention, in the presence of a standard breaker, namely slurried magnesium oxide at potential well temperature and pressures.

The testing was performed on a Brookfield PVS Rheometer designed to test small complex samples by simulating process conditions in a bench top environment (sample boil off conditions are eliminated). The PVS Rheometer measures with a coaxial cylinder geometry and delivers excellent accuracy and outstanding sensitivity. The point at which the viscosity of the fluid reaches zero is the break time. To avoid the fluid breaking prematurely, the break time is typically desired to be greater than 30 minutes.

TABLE J

| | Test Temp (°C.) | % Magnesium Oxide Slurry | % Gellant | % Activator Blend | Initial Viscosity | Break Time |
|---|---|---|---|---|---|---|
| Lauric Gellant | 80 | 0.2 | 3 | 0.3 | 650 cP | 50 mins |
| Tallow Gellant | 80 | 0.2 | 5 | 0.9 | 1500 cP | 15 mins |

One of skill in the art would appreciate, as shown in Table J, that the lauric acid aluminum acylate reaction product is more stable in the presence of magnesium oxide than the tallow fatty acid aluminum acylate reaction product. The additional stability ensures that fracturing fluids using the lauric acid gellant are less likely to break prematurely before a pumping operation is complete.

Example 11

A lauric fatty acid gellant, prepared according to Formulation 1, Example 9, was studied over time to assess the long-term shelf life. The gellant was sealed in a 2 oz French Square at room temperature (20° C.) for an extended period of time. The product was visually observed every week, as shown below in Table K, to see if there were any noticeable changes in the appearance of the product, as well as in the viscosity.

TABLE K

| Week Number | Visual Observations |
|---|---|
| 1 | Good clarity and poured well |
| 2 | Good clarity, fluid still poured okay but increasing in viscosity |
| 3 | Good clarity but fluid having difficulty pouring due to increase in viscosity |
| 4 | Product had solidified |

Applicant believes that use of diethylamine does not completely inhibit the solidifying of the lauric acid aluminum acylate reaction product, over time.

Example 12

Applicant conducted additional experimentation to find a suitable alternative to DEA to permit a commercial product, produced according to embodiments of the invention, to have an extended shelf life.

Applicant determined that a small concentration of formic acid would prevent the reaction product gellant from solidifying over longer periods of time. It is hypothesized that the formic acid creates a slight acidic environment that prevents the hydroxyl group from hydrogen bonding to other aluminum fatty acid molecules.

As shown in Table L below, Xylene was used as the carrier, having a lower initial viscosity than the commercially available product ENVIRODRILL™, used in Example 9.

TABLE L

| Additives | Concentration |
|---|---|
| Aluminum Acylate | 5.8 g |
| Isopropyl Hexanoate | 4.2 g |
| 2-Ethyl Hexanoic Acid | 4.5 g |
| Lauric Acid | 2.5 g |
| 25% Formic in Isopropyl Alcohol | 0.15 g |

TABLE L-continued

| Additives | Concentration |
|---|---|
| Xylene | 12.7 |
| Vortex Closure Time | 10 s |
| % Reaction Product | 3 |
| % Activator Blend | 0.3 |
| Viscosity (cP) | 550 |
| Shelf Life | >3 months |

Applicant has observed that the shelf life of the product tested in Example 12 is greater than 3 months and the viscosity is not expected to increase any further.

One of skill in the art would appreciate that the addition of formic acid appears to substantially prevent the product from solidifying. Further, it appears formic acid, added according to an embodiment of the invention, has no detrimental effect on the vortex closure time or other properties of the fracturing fluid.

The embodiments of the invention in which an exclusive property or privilege is claimed are defined as follows:

1. A liquid non-phosphorus gellant for gelling a fracturing fluid comprising:
    one or more asymmetrical liquid reaction products resulting from the reaction of
    oxoaluminum acylate;
    isopropyl hexanoate ester; and
    a fatty acid having from about $C_6$ to about $C_{18}$ and 2-ethylhexanoic acid; and
    an effective amount of a rheology modifier sufficient to preferentially interact with the one or more reaction products for preventing interaction between the one or more reaction products so as to prevent solidifying of the one or more reaction products until such times as the liquid gellant is mixed in the fracturing fluid in which an activator is present;
    wherein the one or more liquid reaction products are a mixture of an aluminum di-2-ethyl hexanoate-fatty acid ester complex and hydroxyl aluminum di-2-ethyl hexanoate; and the gellant gels the fracturing fluid in less than 30 seconds.

2. The gellant of claim 1, wherein the one or more asymmetrical liquid reaction products comprise one or more of the following structures:

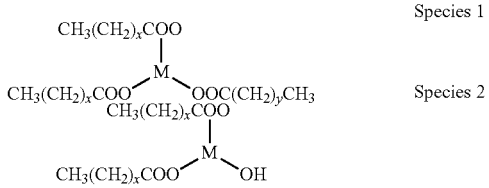

Species 1

Species 2 wherein x and y are from about 5 to about 16; and
wherein M is a multivalent metal.

3. The gellant of claim 1 wherein the rheology modifier is a secondary amine.

4. The gellant of claim 1 wherein the rheology modifier is formic acid.

5. The gellant of claim 1 wherein the one or more liquid reaction products are formed at a temperature of about 60° C.

6. The gellant of claim 1 wherein the fatty acid is tallow fatty acid.

7. The gellant of claim 1 wherein the fatty acid is lauric acid.

8. A hydrocarbon fracturing fluid comprising:
    a hydrocarbon base fluid;
    a gellant comprising one or more asymmetrical, liquid reaction products formed from the reaction of
    oxoaluminum acylate;
    isopropyl hexanoate ester;
    $C_6$ to about $C_{18}$ fatty acid; and
    2-ethylhexanoic acid,
    an effective amount of a rheology modifier sufficient to preferentially interact with the one or more reaction products for preventing interaction between the one or more reaction products so as to prevent solidifying of the one or more reaction products; and
    an effective amount of one or more activators for preferentially interacting between the one or more liquid reaction products for promoting gelling of the hydrocarbon fluid,
    wherein the one or more liquid reaction products are a mixture of an aluminum di-2-ethyl hexanoate-fatty acid ester complex and hydroxyl aluminum di-2-ethyl hexanoate; and
    wherein the gellent causes the hydrocarbon base fluid to gel in less than about 30 seconds.

9. The hydrocarbon fracturing fluid of claim 8 wherein at least one of the one or more activators are polar solvents.

10. The hydrocarbon fracturing fluid of claim 8 wherein at least one of the one or more activators is a dimer fatty acid.

11. The hydrocarbon fracturing fluid of claim 10 wherein the dimer fatty acid is a $C_{36}$ dimer fatty acid.

12. The hydrocarbon fracturing fluid of claim 8 wherein the one or more activators are a dimer fatty acid and water.

13. The hydrocarbon fracturing fluid of claim 10 wherein the dimer fatty acid is added in an amount of less than about 5% by volume.

14. The hydrocarbon fracturing fluid of claim 10 wherein the dimer fatty acid is added in an amount of less than about 1% by volume.

15. The hydrocarbon fracturing fluid of claim 8 wherein the gellant is added to the hydrocarbon fluid at less than about 15% by volume.

16. The hydrocarbon fracturing fluid of claim 8 wherein the gellant is added to the hydrocarbon fluid at less than about 10% by volume.

* * * * *

UNITED STATES PATENT AND TRADEMARK OFFICE
CERTIFICATE OF CORRECTION

PATENT NO. : 7,932,216 B2
APPLICATION NO. : 11/957248
DATED : April 26, 2011
INVENTOR(S) : Smith et al.

It is certified that error appears in the above-identified patent and that said Letters Patent is hereby corrected as shown below:

Col 8, lines 60-65, Species 1, that portion of the formula reading "CH3(CH2)xCOO" should read -- CH3(CH2)3CH(C2H5)COO -- and that portion of the formula reading "CH3(CH2)6COO" should read -- CH3(CH2)3CH(C2H5)COO --.

Col 9, lines 1-5, Species 2, that both portions of the formula reading "CH3(CH2)6COO" should read -- CH3(CH2)3CH(C2H5)COO --.

Signed and Sealed this
Thirty-first Day of May, 2011

David J. Kappos
*Director of the United States Patent and Trademark Office*